(12) United States Patent
Plattner

(10) Patent No.: US 11,877,531 B2
(45) Date of Patent: Jan. 23, 2024

(54) METHOD OF GENERATING FIELD REGIONS FOR AGRICULTURAL DATA ANALYSIS BASED ON CONDITIONAL DATA FILE GENERATION

(71) Applicant: Climate LLC, Saint Louis, MO (US)

(72) Inventor: Kyle Plattner, Edwards, IL (US)

(73) Assignee: CLIMATE LLC, Saint Louis, MO (US)

( * ) Notice: Subject to any disclaimer, the term of this patent is extended or adjusted under 35 U.S.C. 154(b) by 356 days.

(21) Appl. No.: 16/950,677

(22) Filed: Nov. 17, 2020

(65) Prior Publication Data

US 2021/0144911 A1 May 20, 2021

Related U.S. Application Data

(60) Provisional application No. 62/936,750, filed on Nov. 18, 2019.

(51) Int. Cl.
| | | |
|---|---|---|
| A01C 21/00 | (2006.01) | |
| G06Q 50/02 | (2012.01) | |
| G05D 1/02 | (2020.01) | |
| A01B 69/04 | (2006.01) | |
| A01B 79/02 | (2006.01) | |
| A01B 49/06 | (2006.01) | |

(52) U.S. Cl.
CPC .......... A01C 21/005 (2013.01); A01B 69/008 (2013.01); A01B 79/02 (2013.01); G05D 1/0274 (2013.01); G06Q 50/02 (2013.01); A01B 49/06 (2013.01); G05D 2201/0201 (2013.01)

(58) Field of Classification Search
CPC ....... A01C 21/005; A01C 21/00; A01B 49/06; A01B 69/008; A01B 79/02; A01B 49/04; A01B 49/00; A01B 69/007; A01B 69/00; A01B 79/00; G05D 1/0274; G05D 1/0208; G05D 1/021; G05D 1/02; G05D 1/00; G05D 2201/0201; G05D 2201/02; G05D 2201/00; G06Q 50/02; G06Q 50/00
See application file for complete search history.

(56) References Cited

U.S. PATENT DOCUMENTS

| | | | |
|---|---|---|---|
| 8,332,765 B2 | 12/2012 | Ergan et al. | |
| 2001/0016788 A1* | 8/2001 | Hauwiller | ............ A01B 79/005 |
| | | | 700/283 |
| 2012/0290982 A1* | 11/2012 | Hallock | ................ G06F 3/0485 |
| | | | 715/828 |

(Continued)

FOREIGN PATENT DOCUMENTS

| | | |
|---|---|---|
| CN | 109041760 | 12/2018 |
| WO | WO98/22887 | 5/1998 |
| WO | WO2016/200699 | 12/2016 |

*Primary Examiner* — Christopher J. Novosad
(74) *Attorney, Agent, or Firm* — Harness, Dickey & Pierce, P.L.C.

(57) ABSTRACT

Systems and methods are provided for generating a plurality of data files, by: displaying a field map corresponding to an agricultural field through a graphical user interface, selecting multiple locations on the field map, identifying, for each selected location, a corresponding data file, generating and displaying a geographic region comprising locations in the identified corresponding data files, and updating the graphical user interface to include a data panel corresponding to the geographic region.

20 Claims, 12 Drawing Sheets

(56) References Cited

U.S. PATENT DOCUMENTS

| | | | |
|---|---|---|---|
| 2016/0124433 A1* | 5/2016 | Cavender-Bares | A01C 23/008 111/119 |
| 2017/0345282 A1* | 11/2017 | Farrell | G08B 25/009 |
| 2018/0024549 A1 | 1/2018 | Hurd | |
| 2019/0124855 A1 | 5/2019 | Rowan et al. | |
| 2019/0274241 A1* | 9/2019 | Tippery | A01B 35/32 |

* cited by examiner

200 Mobile Computer Application

| 208 Seeds and Planting Instructions | 210 Nitrogen Instructions | 212 Weather Instructions | 214 Field Health Instructions | 216 Performance Instructions |

206 Digital Map Book

205 Script Generation Instructions

204 Overview and Alert Instructions

202 Account, Fields, Data Ingestion, Sharing Instructions

(b)

220 Cab Computer Application

| 222 Maps - Cab | 224 Remote View | 226 Data Collect and Transfer | 228 Machine Alerts | 230 Script Transfer |

232 Scouting - Cab

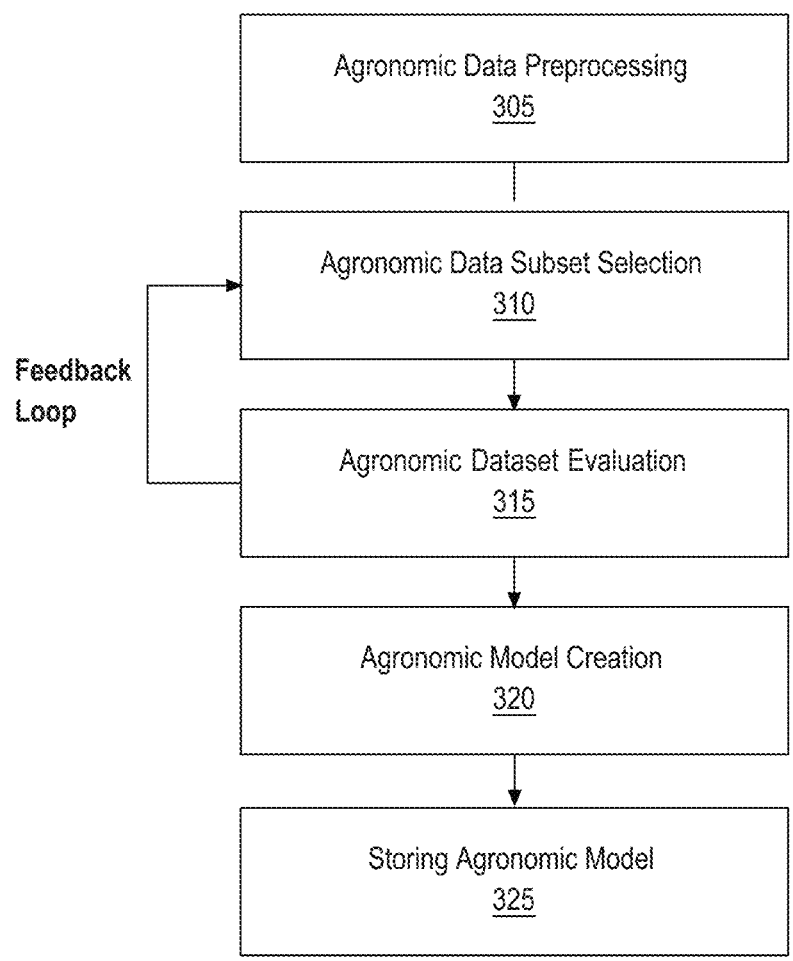

METHOD OF GENERATING FIELD REGIONS FOR AGRICULTURAL DATA ANALYSIS BASED ON CONDITIONAL DATA FILE GENERATION

BENEFIT CLAIM

This application claims the benefit under 35 U.S.C. § 119 of U.S. Provisional Application No. 62/936,750, filed Nov. 18, 2019, the entire contents of which are hereby incorporated by reference as if fully set forth within.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2015-2020 The Climate Corporation.

FIELD OF THE DISCLOSURE

One technical field of the present disclosure is computer-generated graphical user interfaces as applied to agricultural data analysis. Another technical field is transformation and use of agricultural data acquired during traversal of fields by agricultural apparatus such as planters or tractors.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Growers commonly perform field trials in which different seeds or hybrids are planted nearby in the same field, often in alternating or adjacent sets of rows, to evaluate how different hybrids perform compared to others under the same weather conditions and geographic locations. Field trials may involve different planting practices, different fertilization practices, or other forms of differential treatment.

Field trials often result in creating and storing large amounts of data about what practices were performed in which locations at what times, and the results of those practices in terms of yield or other metrics. During or after such field trials, growers may wish to compare the data for different regions of a field, for example to evaluate the performance of one treatment or hybrid versus another. However, present practice does not provide all possible convenient methods for defining the bounds of a region for data analysis.

For example, existing drawing tools require defining bounds freehand using a finger on a touchscreen yet the personnel performing this operation may lack the manual dexterity needed to accurately draw a polygon or other graphical boundary for a field, especially under in-field conditions in the cab of a machine. It may be difficult to select only relevant details when not in the cab, and difficult to recall the details later of where passes occurred. Improved techniques to define field regions for data analysis are needed.

SUMMARY

The appended claims may serve as a summary of the disclosure.

BRIEF DESCRIPTION OF THE DRAWINGS

In the drawings:

FIG. 2 illustrates two views of an example logical organization of sets of instructions in main memory when an example mobile application is loaded for execution.

FIG. 3 illustrates a programmed process by which the agricultural intelligence computer system generates one or more preconfigured agronomic models using agronomic data provided by one or more data sources.

FIG. 5 depicts an example embodiment of a timeline view for data entry.

FIG. 6 depicts an example embodiment of a spreadsheet view for data entry.

DETAILED DESCRIPTION

Figure 1:
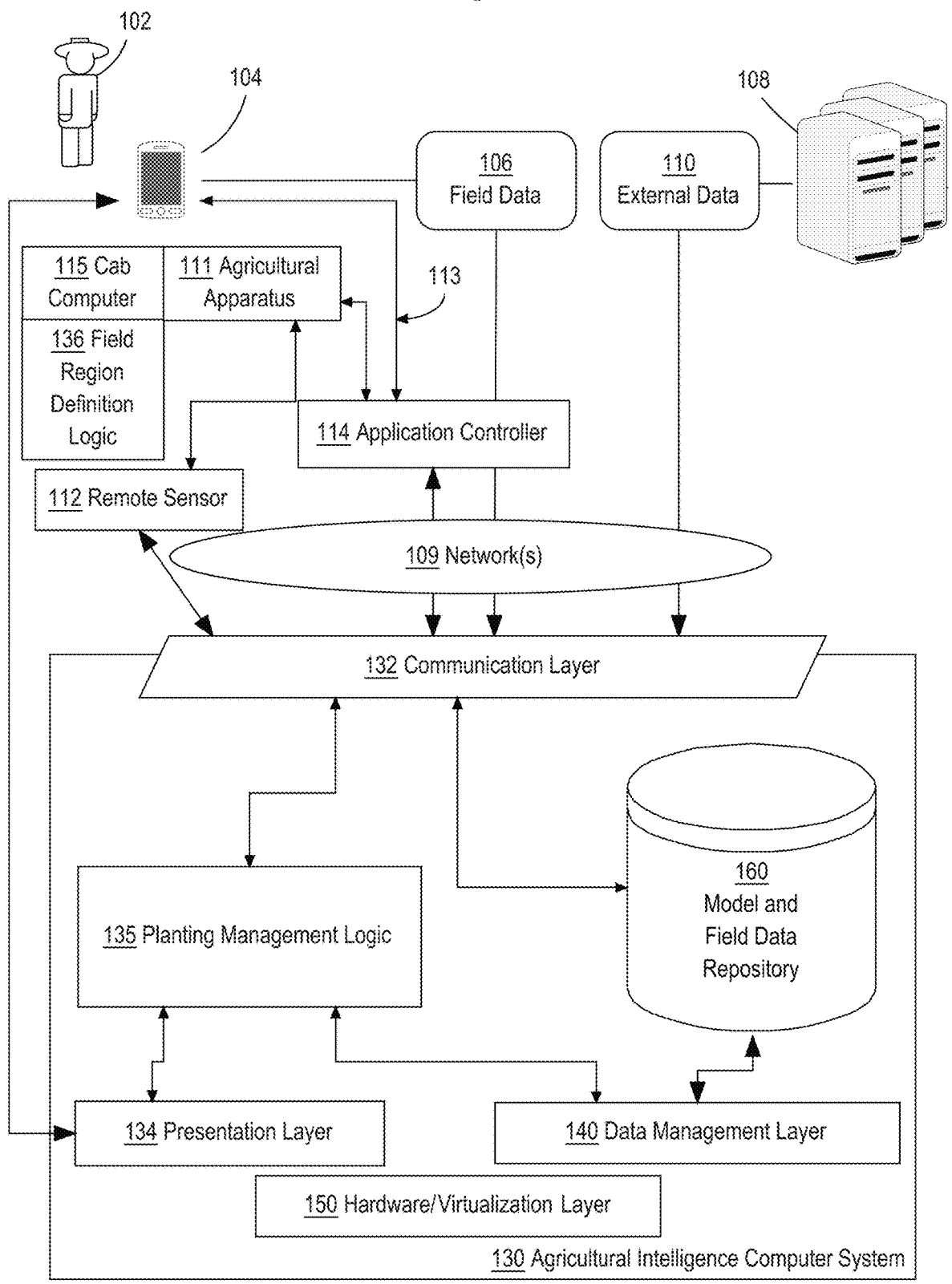
FIG. 1 illustrates an example computer system that is configured to perform the functions described herein, shown in a field environment with other apparatus with which the system may interoperate.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:

1. GENERAL OVERVIEW
2. EXAMPLE AGRICULTURAL INTELLIGENCE COMPUTER SYSTEM
   2.1. STRUCTURAL OVERVIEW
   2.2. APPLICATION PROGRAM OVERVIEW
   2.3. DATA INGEST TO THE COMPUTER SYSTEM
   2.4. PROCESS OVERVIEW—AGRONOMIC MODEL TRAINING
   2.5. IMPLEMENTATION EXAMPLE—HARDWARE OVERVIEW
3. EXAMPLE PROCESS OF DEFINING FIELD REGIONS BASED ON PASS DATA
1. General Overview Growers use planters or sprayers, either self-powered or towed behind a tractor or other apparatus, to apply different hybrids or apply different treatments in rows in the field. As this equipment traverses a field, it typically repeatedly crosses the field in opposing directions in movements termed passes. One pass across a field may comprise one or more planted rows or one or more treatments that are the same. A return pass can be the same or different. Apparatus can start and stop a pass within the field at any point. The equipment may be fitted with global positioning system (GPS) receivers that continuously generate latitude-longitude data as the apparatus starts, conducts or completes passes. This data may be locally stored in a cab computer, then transmitted via wired or wireless links to removable storage devices, other computers, networked resources or cloud computing centers.

In an embodiment, growers who perform field trials with planters or sprayers may use pass data, which is generated when the equipment traverses a field, to define a field region. The bounds and annotated details of a field region may be edited, but in an embodiment, the bounds and attributes are created principally by recording areas of the field that are covered while operating a planter or sprayer. Being able to record areas while in the cab provides an improved, convenient method, supported by computer execution, to ensure that a desired field region and corresponding data is accurately defined.

In some embodiments, while in the cab operating a planter or sprayer, a grower can select an option, which is graphically displayed by a cab computer, to create or record a field region, enter details of a field trial, make several passes in the field, and then tap stop or done. This causes creating a new field region based on the places in the field where the equipment traveled during this duration of time while recording. These field trials may be named, saved and ready to report on or view again at another time in the growing season.

Alternatively, after one or more passes are complete, pass data may be displayed in the graphical user interface of the cab computer, and the grower can select prior passes graphically, adjust endpoints, and collect more than one pass in a region.

Further details of embodiments, aspects and features of these approaches will become apparent from the disclosure as a whole.

2. Example Agricultural Intelligence Computer System 2.1 Structural Overview

FIG. 1 illustrates an example computer system that is configured to perform the functions described herein, shown in a field environment with other apparatus with which the system may interoperate. In one embodiment, a user 102 owns, operates or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) chemical application data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, rainfall rate, predicted rainfall, water runoff rate region, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of data that might otherwise be obtained from third party sources, such as weather data. In some embodiments, an external data server 108 may actually be incorporated within the system 130.

An agricultural apparatus 111 may have one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, aerial vehicles including unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines, harvesters, sprayers, and cultivators. Application controller 114 is communicatively coupled to agricultural intelligence computer system 130 via the network(s) 109 and is programmed or configured to receive one or more scripts that are used to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, California, is used. Sensor data may consist of the same type of information as field data 106. In some embodiments, remote sensors 112 may not be fixed to an agricultural apparatus 111 but may be remotely located in the field and may communicate with network 109.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a graphical screen display, such as a color display, that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, distributed databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U. S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 5:
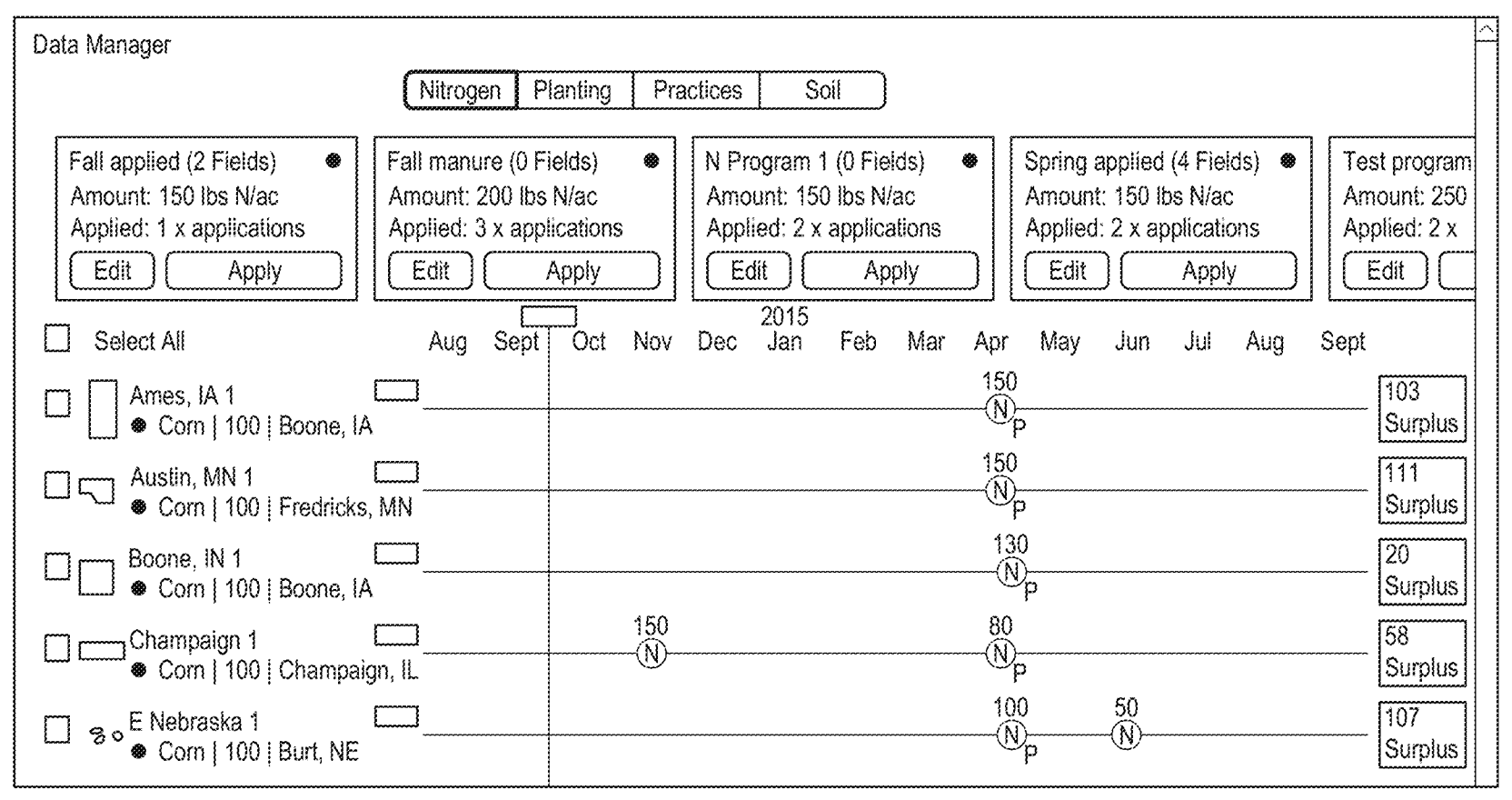

FIG. 5 depicts an example embodiment of a timeline view for data entry. Using the display depicted in FIG. 5, a user computer can input a selection of a particular field and a particular date for the addition of event. Events depicted at the top of the timeline may include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 5, the top two timelines have the "Spring applied" program selected, which includes an application of 150 lbs N/ac in early April. The data manager may provide an interface for editing a program. In an embodiment, when a particular program is edited, each field that has selected the particular program is edited. For example, in FIG. 5, if the "Spring applied" program is edited to reduce the application of nitrogen to 130 lbs N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 5, the interface may update to indicate that the "Spring applied" program is no longer being applied to the top field. While the nitrogen application in early April may remain, updates to the "Spring applied" program would not alter the April application of nitrogen.

Figure 6:
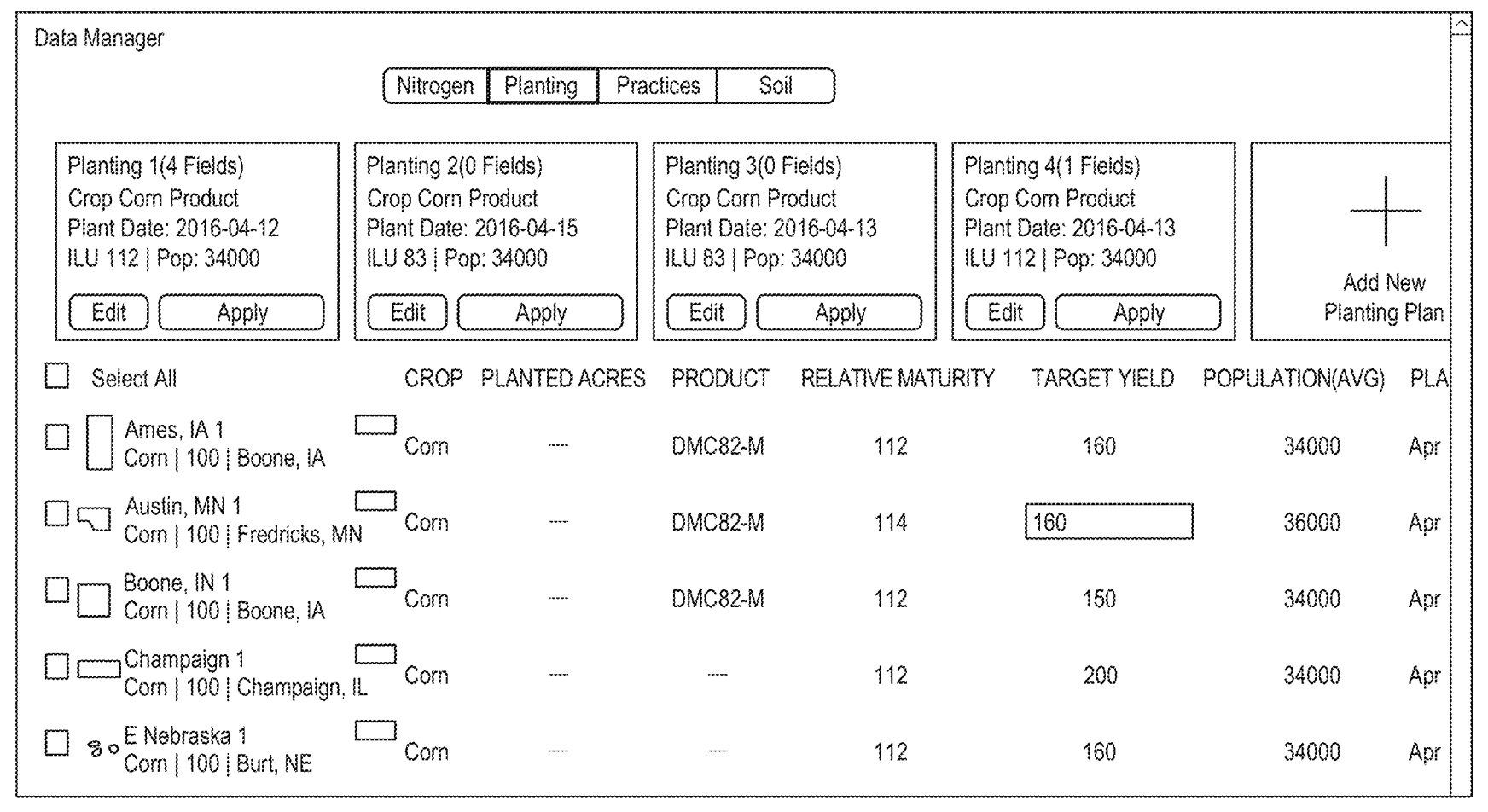

FIG. 6 depicts an example embodiment of a spreadsheet view for data entry. Using the display depicted in FIG. 6, a user can create and edit information for one or more fields. The data manager may include spreadsheets for inputting information with respect to Nitrogen, Planting, Practices, and Soil as depicted in FIG. 6. To edit a particular entry, a user computer may select the particular entry in the spreadsheet and update the values. For example, FIG. 6 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored or calculated output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

In an embodiment, planting management logic 135 and field region definition logic 136 comprises a set of one or more pages of main memory, such as RAM, in the agricultural intelligence computer system 130 into which executable instructions have been loaded and which when executed cause the agricultural intelligence computer system to perform the functions or operations that are described herein with reference to those modules. In an embodiment, planting management logic 135 is programmed to receive data specifying planting or treatment practices from apparatus 111 and/or cab computer 115, perform yield calculations or computation of other metrics and store the resulting data in repository 160. Thus, planting management logic 135 provides a cloud-based computational resource for collecting large quantities of data originally generated in the field at apparatus 111 and calculating complex metrics based on the data. The field region definition logic 136 is integrated with cab computer 115 and is programmed to implement the process of FIG. 7 and to generate the screen displays shown in FIG. 8, FIG. 9, FIG. 10, FIG. 11.

In each case, the instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, each of planting management logic 135 and field region definition logic 136 also may represent one or more files or projects of source code that are digitally stored in a mass storage device such as non-volatile RAM or disk storage, in the agricultural intelligence computer system 130 or a separate repository system, which when compiled or interpreted cause generating executable instructions which when executed cause the agricultural intelligence computer system to perform the functions or operations that are described herein with reference to those modules. In other words, the drawing figure may represent the manner in which programmers or software developers organize and arrange source code for later compilation into an executable, or interpretation into bytecode or the equivalent, for execution by the agricultural intelligence computer system 130.

Figure 4:
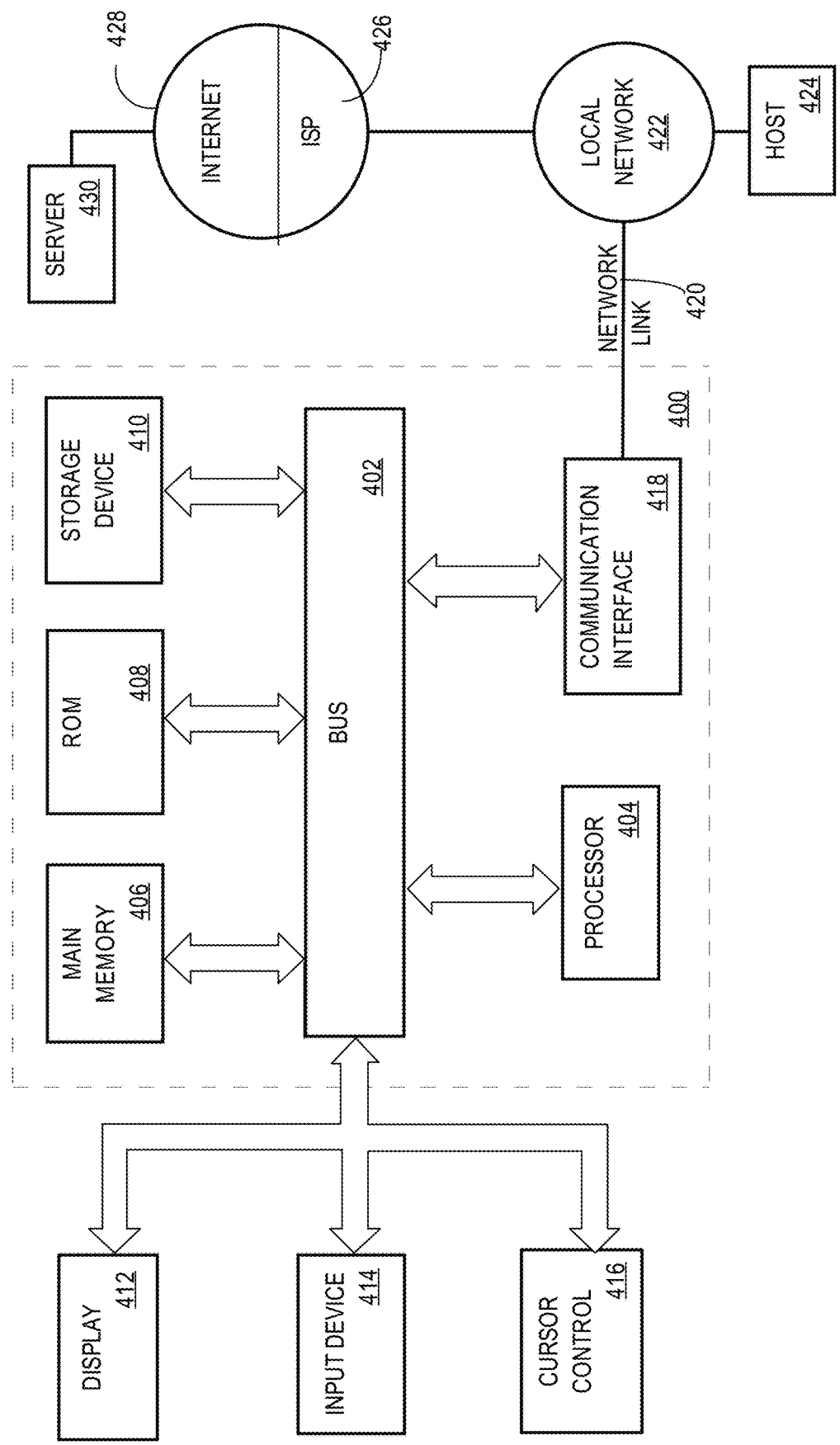
FIG. 4 is a block diagram that illustrates a computer system upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML, and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), WiFi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114 which include an irrigation sensor and/or irrigation controller. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, California. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account, fields, data ingestion, sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data. Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally, and/or alternatively, a script may be sent directly to cab computer 115 from mobile computer application 200 and/or uploaded to one or more data servers and stored for further use.

In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of fertilizer application zones and/or images generated from subfield soil data, such as data obtained from sensors, at a high spatial resolution (as fine as millimeters or smaller depending on sensor proximity and resolution); upload of existing grower-defined zones; providing a graph of plant nutrient availability and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields and/or zones that have been defined in the system; example data may include nitrogen application data that is the same for many fields and/or zones of the same grower, but such mass data entry applies to the entry of any type of field data into the mobile computer application 200. For example, nitrogen instructions 210 may be programmed to accept definitions of nitrogen application and practices programs and to accept user input specifying to apply those programs across multiple fields. "Nitrogen application programs," in this context, refers to stored, named sets of data that associates: a name, color code or other identifier, one or more dates of application, types of material or product for each of the dates and amounts, method of application or incorporation such as injected or broadcast, and/or amounts or rates of application for each of the dates, crop or hybrid that is the subject of the application, among others. "Nitrogen practices programs," in this context, refer to stored, named sets of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium), application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, yield differential, hybrid, population, SSURGO zone, soil test properties, or elevation, among others. Programmed reports and analysis may include yield variability analysis, treatment effect estimation, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 232 may be programmed to display location-based alerts and information received from the system 130 based on the location of the field manager computing device 104, agricultural apparatus 111, or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, California, may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or WiFi-based position or mapping apps that are programmed to determine location based upon nearby WiFi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus; other electromagnetic radiation emitters and reflected electromagnetic radiation detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

In an embodiment, sensors 112 and controllers 114 may comprise weather devices for monitoring weather conditions of fields. For example, the apparatus disclosed in U.S. Provisional Application No. 62/154,207, filed on Apr. 29, 2015, U.S. Provisional Application No. 62/175,160, filed on Jun. 12, 2015, U.S. Provisional Application No. 62/198,060, filed on Jul. 28, 2015, and U.S. Provisional Application No. 62/220,852, filed on Sep. 18, 2015, may be used, and the present disclosure assumes knowledge of those patent disclosures.

2.4. Process Overview-Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, fertilizer recommendations, fungicide recommendations, pesticide recommendations, harvesting recommendations and other crop management recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge or sensor providing weather data at the same or nearby location or an estimate of nitrogen content with a soil sample measurement.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise, distorting effects, and confounding factors within the agronomic data including measured outliers that could adversely affect received field data values. Embodiments of agronomic data preprocessing may include, but are not limited to, removing data values commonly associated with outlier data values, specific measured data points that are known to unnecessarily skew other data values, data smoothing, aggregation, or sampling techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared and/or validated using one or more comparison techniques, such as, but not limited to, root mean square error with leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infrared data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3. Example Process of Defining Field Regions Based on Pass Data 3.1 Defining Field Regions During Operation of Apparatus A first embodiment comprises a computer-implemented process that is executed during field operation of agricultural apparatus 111 (FIG. 1). In this embodiment, while in the cab operating a planter, sprayer or other apparatus 111, a grower 102 interacts with cab computer 115, which executes field region definition logic 136. The cab computer 115 comprises a touchscreen display that outputs a graphical user interface. The field region definition logic 136 is programmed to implement the following.

1. The grower 102 selects an option that is graphically displayed by the cab computer 115 to create or record a field region. In response, field region definition logic 136 causes displaying a field details panel.

2. Optionally, the grower can enter details of a field trial in the field details panel. Example details include identification of a hybrid. Other data may be automatically collected by cab computer 115, such as the present date and time and/or geo-location data from a GPS receiver on the apparatus 111 and coupled to the cab computer.

3. The grower 102 makes one or more passes in the field by operating the apparatus 111. These passes may involve seeding, planting, spraying or other treatment operations. During any such passes, GPS position data and other data such as seeding rate, treatment type, date and time is automatically continuously collected by cab computer 115 and receivers or sensors, such as sensors 112, coupled to the cab computer and stored in local memory.

4. The grower 102 returns attention to the cab computer and taps a STOP or DONE icon, graphical button or link in the GUI. In response, field region definition logic 136 creates and stores data for a new field region based on the places in the field where the equipment traveled during this duration of time while recording. These field trials may be named, saved and ready to report on or view again at another time in the growing season.

3.2 Defining Field Regions after Pass Data is Collected

Figure 7:
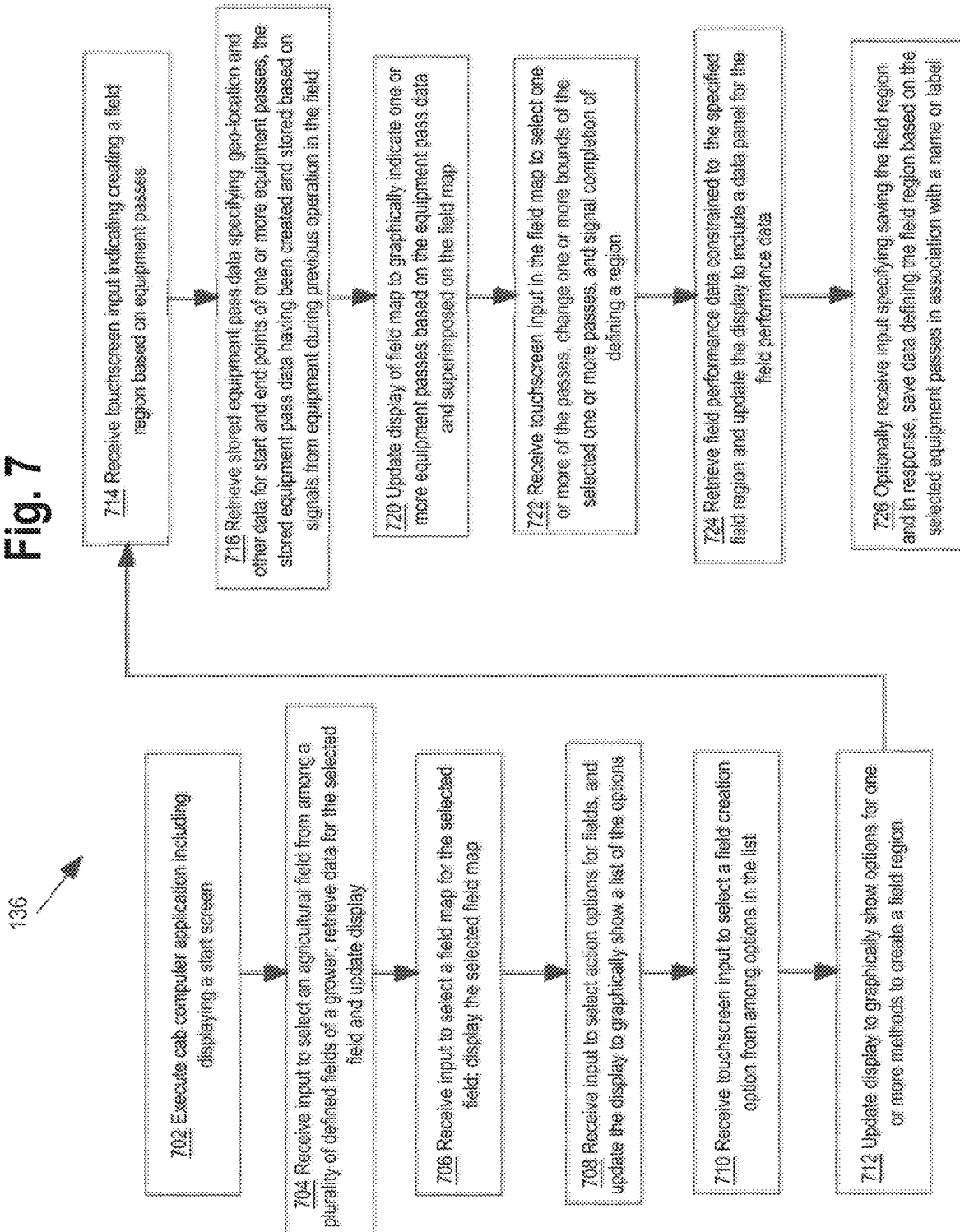
FIG. 7 illustrates an example process that may be programmed to implement defining field regions based on pass data.

FIG. 7 illustrates an example process that may be programmed to implement defining field regions based on pass data. FIG. 8, FIG. 9, FIG. 10, FIG. 11 illustrate example screen displays that may be generated and displayed by a cab computer, for example under program control using the process of FIG. 7. Referring first to FIG. 7, in an embodiment, at step 702, field region definition logic 136 is programmed to execute as a cab computer application, including displaying a start screen.

At step 704, field region definition logic 136 is programmed to receive input to select an agricultural field from among a plurality of defined fields of a grower. For example, the grower may apply touchscreen input to a touchscreen display coupled to the cab computer to select a particular named, previously defined field using a pull-down menu, list or other GUI widget. In response, field region definition logic 136 is programmed to retrieve data for the selected field and update the display. Data may be retrieved from local memory of the cab computer 115, or from the repository of FIG. 1 via wireless networking.

At step 706, field region definition logic 136 is programmed to receive input to select a field map for the selected field. For example, memory of the cab computer 115 may store multiple different field maps that have been previously generated for the selected field. In response, field region definition logic 136 is programmed to display the selected field map in the display of the cab computer. FIG. 8, FIG. 9, FIG. 10, FIG. 11 illustrate graphical displays of example field maps that may be displayed in some embodiments, as further described herein. In some embodiments, the field map may be a planting map.

Figure 8:
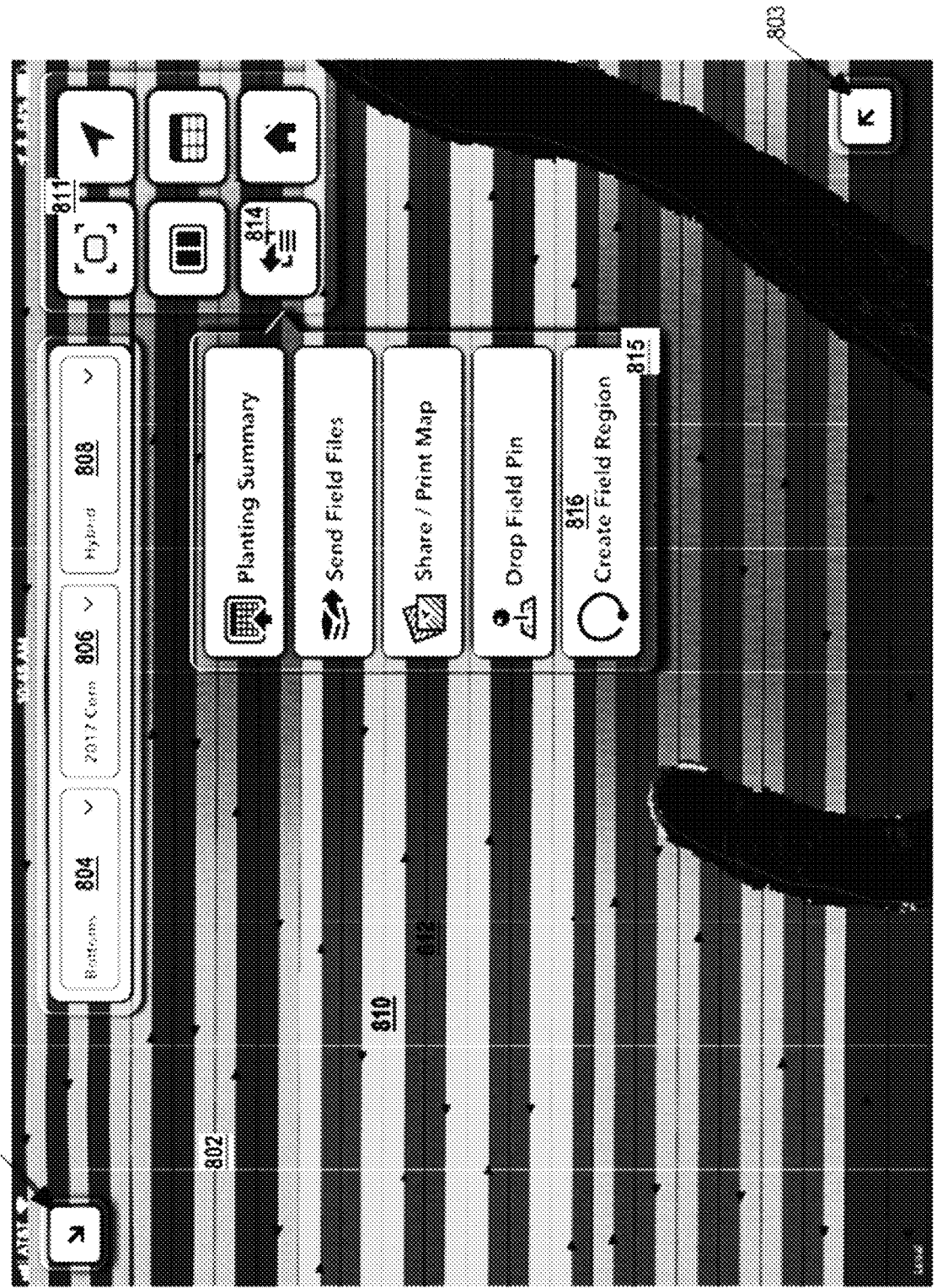
FIG. 8, FIG. 9, FIG. 10, FIG. 11 illustrate example screen displays that may be generated and displayed by a cab computer, for example under program control using the process of FIG. 7.

At step 708, field region definition logic 136 is programmed to receive input to select action options for fields. In response to the selection, field region definition logic 136 is programmed to update the display to graphically show a list of the options. Referring now to FIG. 8, in one embodiment, the preceding steps may cause generating and displaying a field map 802 in the GUI of the cab computer. In an embodiment, field map 802 comprises zoom controls 803, field details options 804, 806, 808, action options 811, and an options list 815. In an embodiment, zoom controls 803 are programmed to zoom a display of the field map 802 to higher or lower levels of resolution in response to touchscreen input to the controls by tapping on the controls for example. In an embodiment, field map 802 comprises a plurality of visually distinct rows 810, 812 representing rows of a field that have been planted with different seeds or hybrids or associated with different row treatments such as different levels or kinds of fertilizer. In some embodiments, rows associated with a particular hybrid may be visually displayed in a distinct manner such as using a particular color for a particular hybrid. Other embodiments may use shading, hatching or other visual treatment to indicate hybrids or treatments.

In an embodiment, a field ID control 804 is programmed to permit selecting among different fields for which data has been stored. In an embodiment, a planting control 806 is programmed as a pull-down menu GUI widget that is associated with different kinds of plantings of the same field in different seasons. In an embodiment, a hybrid control 808 is programmed as a pull-down menu GUI widget that is associated with different hybrids that are defined in stored data and available to indicate as the hybrid that was planted in the field or in a row. Selecting any of the controls 804, 806, 808 causes field region definition logic 136 to update the screen display 802 to include a pull-down list of available data items corresponding to the selected control. Data to populate a pull-down list may be retrieved from storage that is coupled to cab computer 115. Data items shown in a list for field ID control 804 comprise any named field that the grower has previously identified in terms of location, size and other parameters. Data items shown in a list for planting control 806 comprise any named planting that the grower created to correspond to a planting session of the current season. Data items shown in hybrid control 808 may comprise all hybrids that the grower has previously purchased from vendors of hybrids and/or an inventory of hybrids that a particular vendor specifies.

In an embodiment, action options 811 comprises a set of links, graphical buttons or other widgets which when selected cause activating display control functions, data display functions or option lists. In some embodiments, links in the action options 811 are programmed to modify a zoom level, scope or size of the screen display 802; to center the screen display at a then-current location of a planter, sprayer or other apparatus that is coupled to the cab computer 115; to display a table view of field data, rather than a planting view; to return to a home or start screen; and other controls. In an embodiment, an options control 814 in the action options 811 is programmed to display the options list 815 when selected. In an embodiment, options list 815 comprises a pop-up list, as shown, of functions such as displaying a planting summary, transmitting field files to other computers, sharing or printing the planting map, marking a location in the planting map, or creating a field region as indicated by a Create Field Region button 816.

Figure 9:
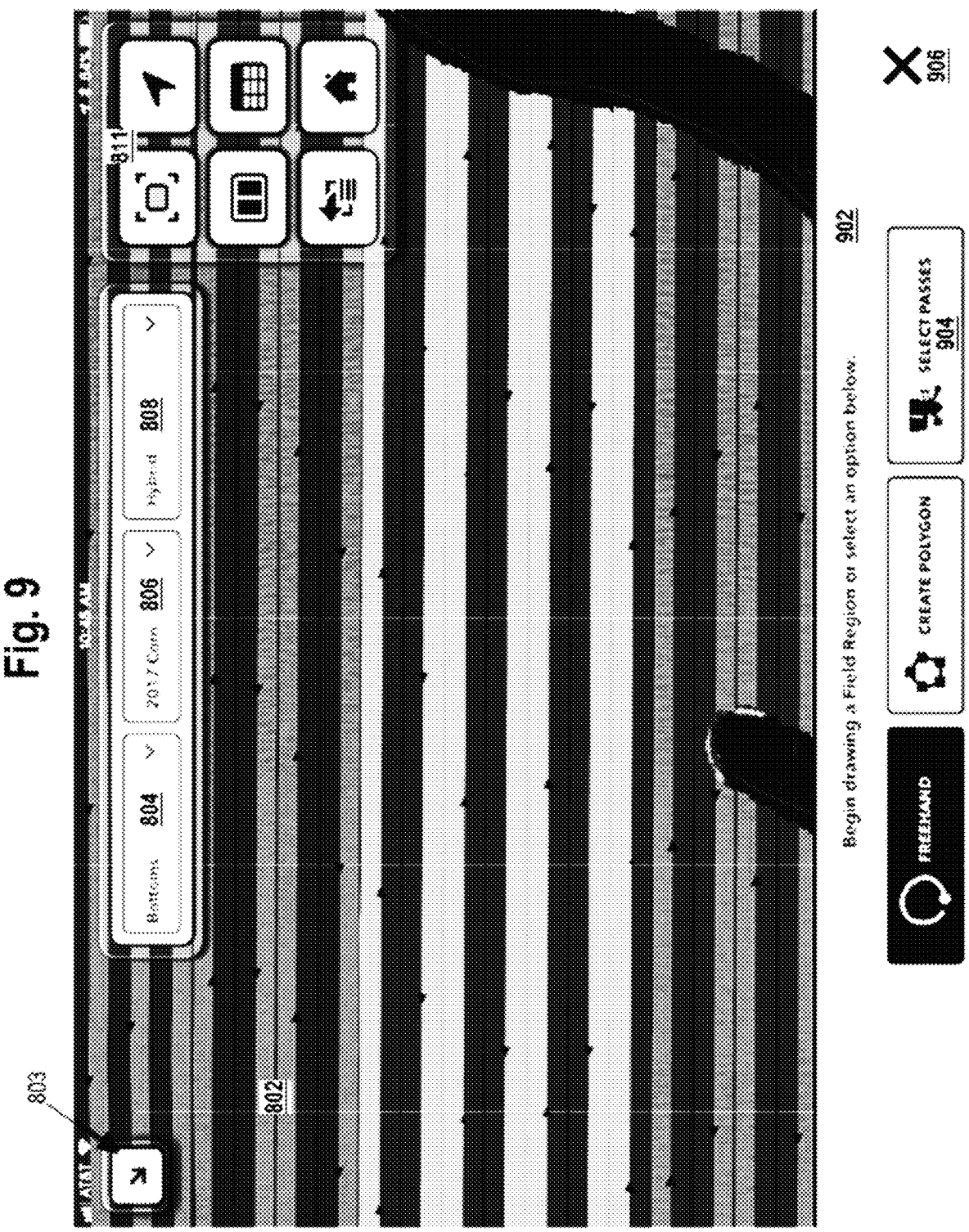

At step 710, field region definition logic 136 is programmed to receive touchscreen input to select a field creation option from among options in the list. For example, touchscreen input selects the Create Field Region button 816 of FIG. 8. In response, at step 712, field region definition logic 136 is programmed to update the display to graphically show options for one or more methods to create a field region. Referring now to FIG. 9, in one embodiment, step 712 comprises updating screen display 802 to display a field region selection bar 902 comprising a plurality of graphical buttons including a pass selection button 904. The selection bar 902 may include graphical buttons that are programmed to enable digitally creating a field region definition by freehand drawing or defining a polygon by selecting points in the field map shown in display 802. The selection bar 902 also may comprise an exit control 906 which when selected causes the field region definition logic 136 to update the display by closing or removing the selection bar. These are illustrated at the bottom of FIG. 10 to illustrate a clear example but could be in any position in the screen display 802 in other embodiments.

At step 714, field region definition logic 136 is programmed to receive touchscreen input indicating creating a field region based on equipment passes. For example, in one embodiment touchscreen input indicates selecting Select Passes button 904 as seen in FIG. 9. In response, at step 716, field region definition logic 136 is programmed to retrieve stored equipment pass data specifying geo-location and other data for start and end points of one or more equipment passes, the stored equipment pass data having been created and stored based on signals from equipment during previous operation in the field.

Furthermore, at step 720, field region definition logic 136 is programmed to update display of field map to graphically indicate one or more equipment passes based on the equipment pass data and superimposed on the field map. Referring now to FIG. 10, in one embodiment executing step 720 comprises the field region definition logic 136 updating the screen display 802 to visually indicate a plurality of equipment passes 1002, 1004, 1006 each having a start point and endpoint indicated by controls 1008, 1009. An equipment pass, in this context, comprises graphical lines, bars, or polygons in the screen display 802 that indicate the actual path that a planter, sprayer or other apparatus previously traversed in the field. In an embodiment, each equipment pass 1002, 1004, 1006 is graphically drawn in the screen display 802 based upon receiving geo-location data and metadata specifying start and stop points of passes that were generated and stored in storage of cab computer 115 as the equipment in which the cab computer is installed actually traversed a field. Thus, the passes shown in FIG. 10 are displayed based on data for actual passes conducted by the same equipment and cab computer that generates the display FIG. 10.

Figure 10:
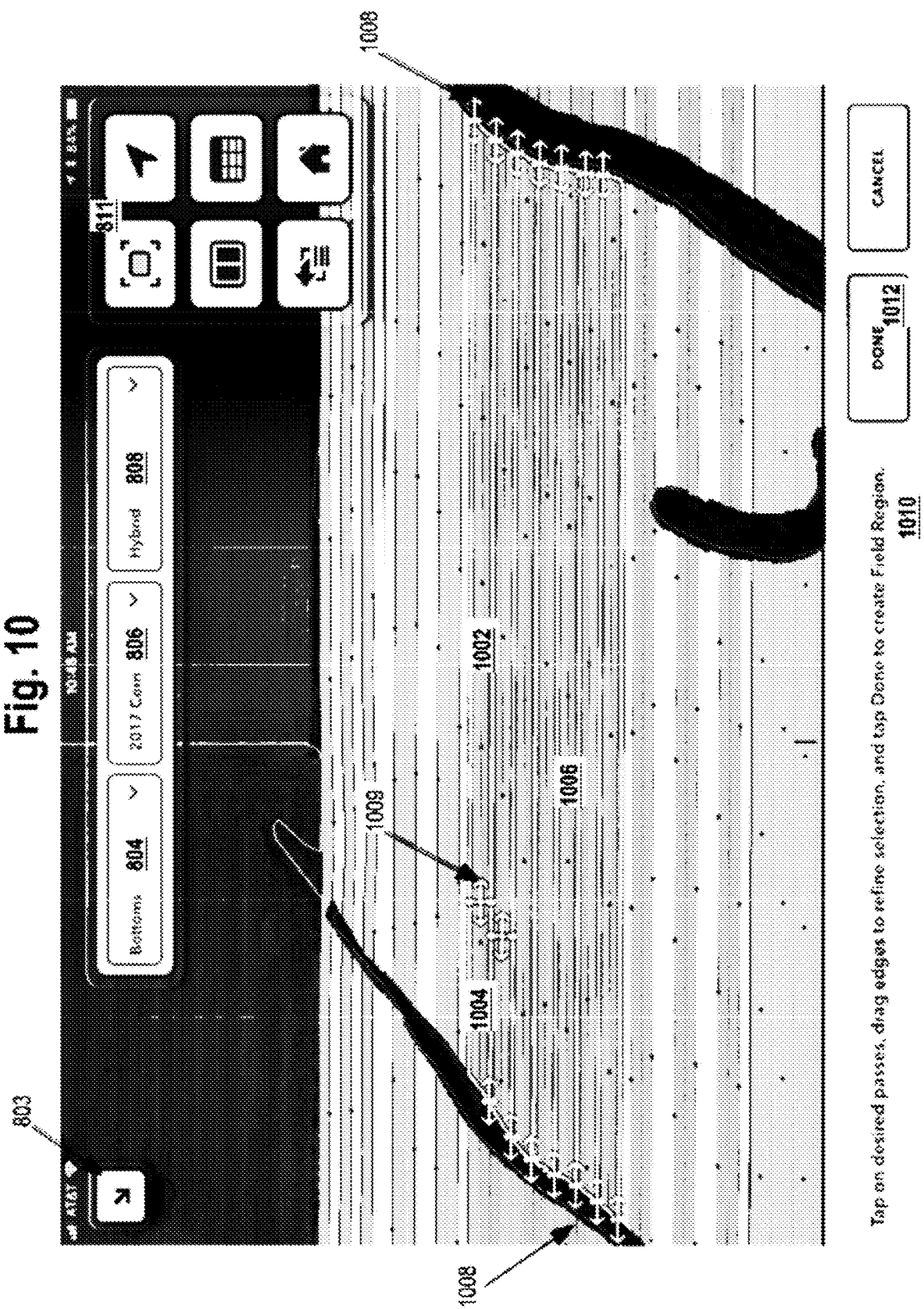

The display of FIG. 10 further comprises a prompt bar 1010 comprising a Done control 1012 and a Cancel control. These are illustrated at the bottom of FIG. 10 to illustrate a clear example but could be in any position in the screen display 802 in other embodiments.

Controls 1008, 1009, in one embodiment, are graphical controls responsive to touchscreen input that can be dragged or moved in the display 802 under touch control. By default, the controls 1008, 1009 are displayed in positions of display 802 that correspond to actual geo-locations at which a planter, sprayer or other apparatus started or stopped a pass. In some cases, a control, such as control 1009, may be displayed within a row of a planting map; this position indicates that apparatus stopped and started at that point. In some cases, two controls may be displayed spaced apart in a planting row; this can occur, for example, when spraying stops, followed by an equipment movement to another location in the row, followed by resuming spraying. Other interruption of equipment operation, for planting, treatment or other operations, may cause similar displays of controls based on the data that is collected for those operations and their geo-locations.

At step 722, field region definition logic 136 is programmed to receive touchscreen input in the field map to select one or more of the passes, change one or more bounds of the selected one or more passes, and signal completion of defining a region. For example, in an embodiment, touchscreen input taps on the pass 1006, drags the endpoint controls 1008 of the pass to adjust their position, and selects Done button 1012 to signal that defining a region is complete. Touchscreen input also could specify a plurality of the passes 1002, 1004, 1006 for a larger field region consisting of multiple passes. Touchscreen input also could adjust different controls 1008 of any zero or more of the passes 1002, 1004, 1006 to specify boundaries of the multiple-pass field region. In this manner, a region of a field can be graphically defined quickly by receiving touchscreen input that interacts with passes that have been displayed based on previously collected pass data corresponding to apparatus movement. Rather than performing a freehand drawing on screen display 802 to define a region or drawing a polygon via repeated taps or controls to define edges and vertices of the polygon, the grower 102 can rely on existing data that already defines passes in terms of all or portions of rows in the field or other boundaries. Consequently, the present techniques permit the cab computer 115 to obtain a definition of a field region using fewer items of touchscreen input and fewer new data points, thus reducing the amount of computer processing needed to process user input and reducing the amount of storage needed to define a region.

Figure 11:
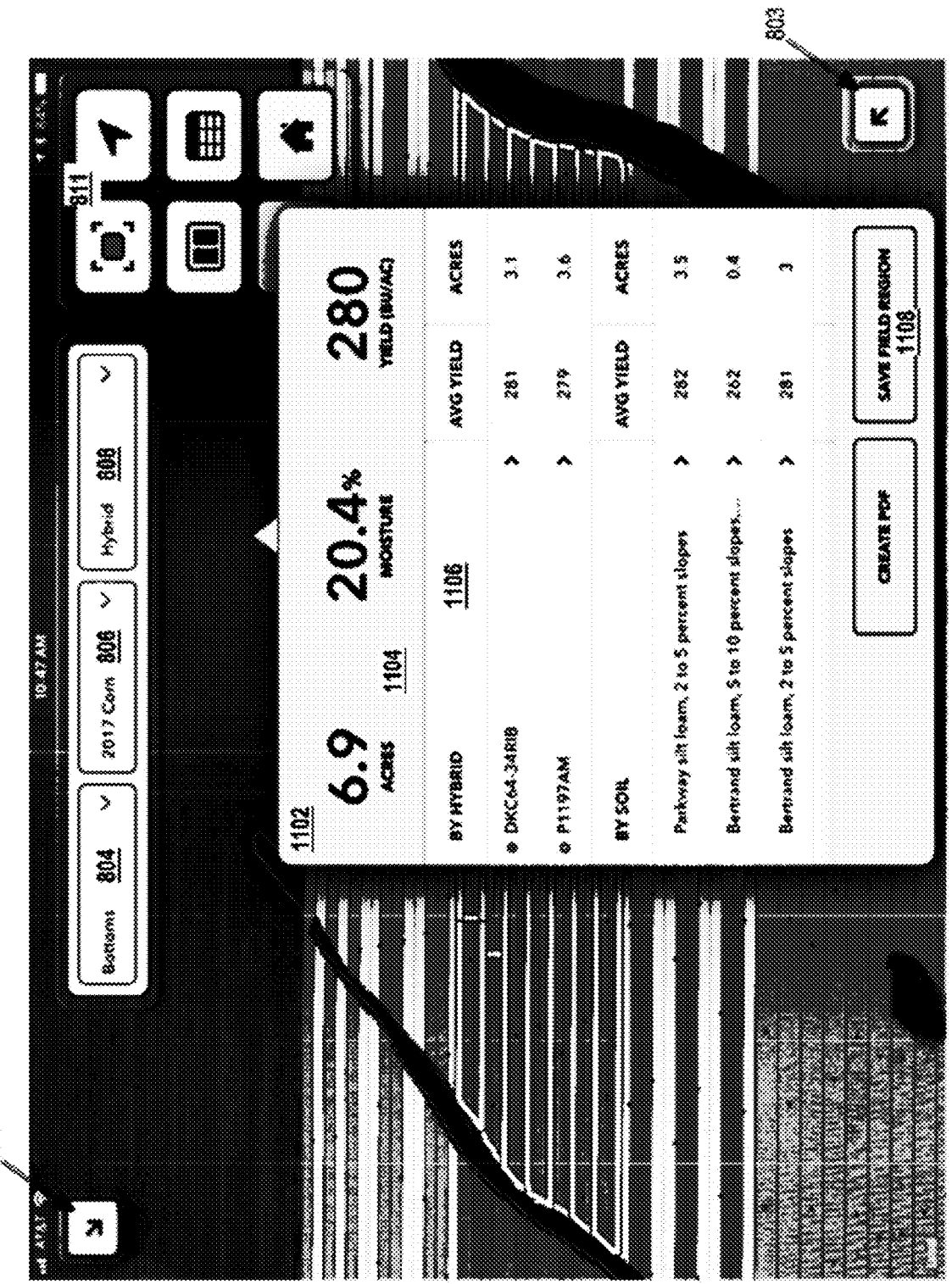

At step 724, field region definition logic 136 is programmed to retrieve field performance data constrained to the specified field region and update the display to include a data panel for the field performance data. Referring now to FIG. 11, in one embodiment, step 724 may comprise generating and displaying a field region data panel 1102 comprising a basic data bar 1104 and a data table 1106. While FIG. 11 depicts the data panel 1102 as a display including a data bar and data table, other embodiments may include different types of displays. For example, data panel 1102 may be an external report which may be displayed on a screen, stored in memory, or transmitted to an external computing device. Additionally or alternatively, the data panel 1102 may be a modal-less display which may be displayed on a screen with other displays.

In an embodiment, the basic data bar 1104 displays fundamental data values such as size, moisture content and actual or predicted yield for only the field region that has been defined in the preceding steps. The data shown in field region data panel 1102 may be locally calculated at cab computer 115 by retrieving stored data for the field as a whole, selecting values from the data based upon the field region boundaries that have been defined using equipment passes, and calculating values for display based on the selected values. In this manner, data in field region data panel is constrained to comprise a dynamically updated display that is tied to the field region that has been defined and does not reflect values for the field as a whole. Consequently, grower 102 or other computers can receive a dataset that is constrained to a specified field region even if the grower has not previously calculated or seen those values. Therefore, the grower 102 or other computers can receive a dataset that did not exist before but that has been dynamically calculated from a larger dataset of values for the entire field, constrained to values associated with the particular field region that was defined.

As an example, FIG. 11 shows data table 1106 comprising data for average yield and area in acres for specified hybrids and soil types that are within the defined region. However, other embodiments may generate and display data for other metrics, such as nutrient content, seed population, average temperature, or other metrics associated with the field region and already stored in local storage of the cab computer 115 as part of the planting map or other field data definitions.

At step 726, field region definition logic 136 is programmed to optionally receive input specifying saving the field region and in response, save data defining the field region based on the selected equipment passes in association with a name or label. For example, in an embodiment, touchscreen input selects a Save Field Region button 1108 in FIG. 11. In response, cab computer 115 creates and stores a record in local storage that persistently stores the boundaries of the sub-field region that has been defined based on the equipment pass data, in association with metadata such as a name, growing season, date-time and so forth. This data may be automatically assigned by retrieving values from the system clock and/or inheriting values from the planting map that had been displayed to select passes for the field region. Or, step 726 may comprise generating and displaying an input dialog comprising an editable input field that prompts grower 102 to enter data values for the field region.

3.3 Defining Field Regions Using Logical Groupings

Figure 12:
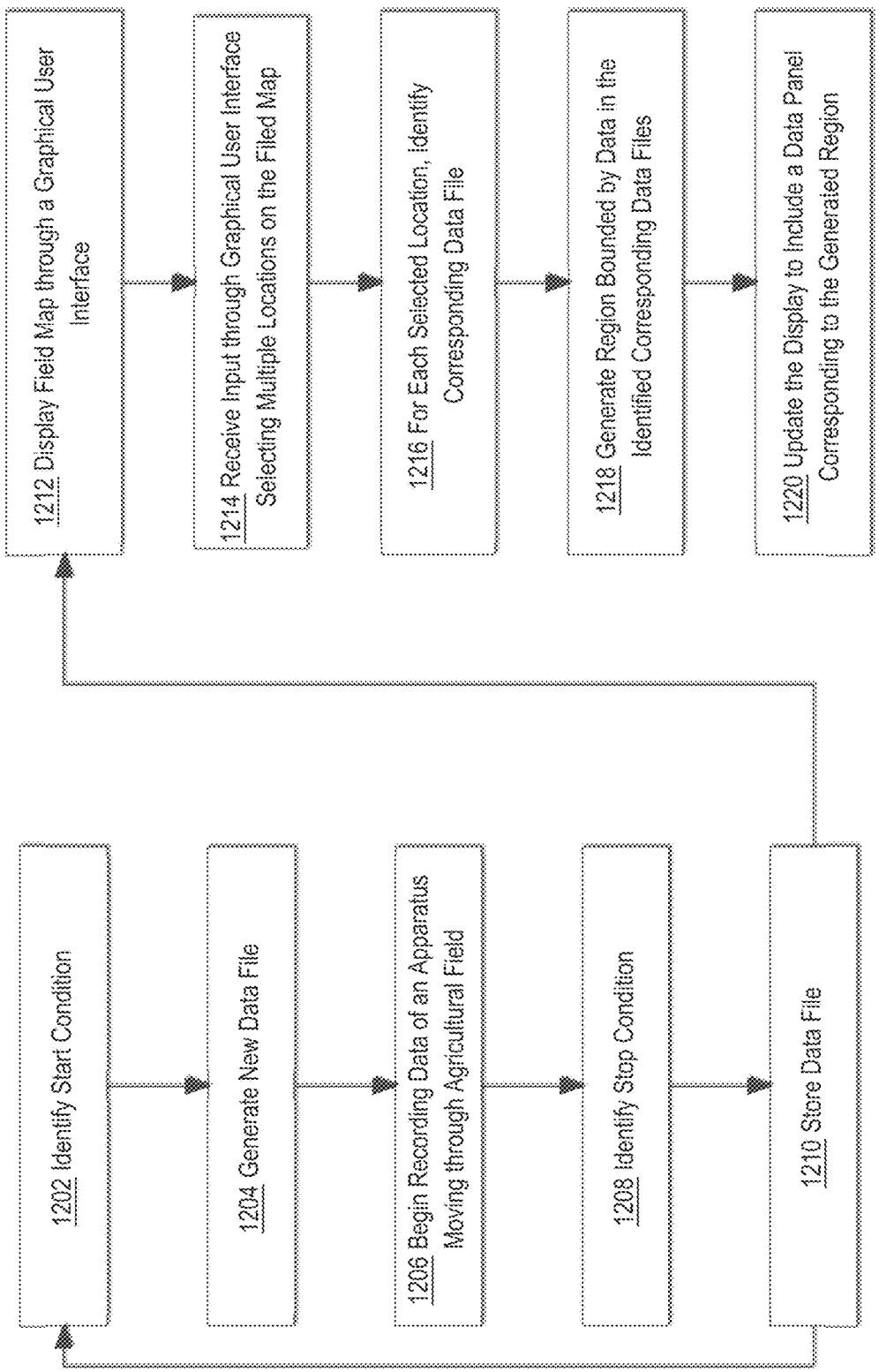
FIG. 12 illustrates an example process that may be programmed to implement defining field regions using local groupings.

FIG. 12 illustrates an example process that may be programmed to implement defining field regions using local groupings. The method illustrated in FIG. 12 can be performed at the agricultural intelligence computing system 130 and/or at the cab computer 115.

At step 1202, a computing system identifies a start condition. The start condition may be one that is explicitly input, such as receiving input through the cab computer to begin recording a pass. For example, the cab computer may display an option to begin recording a pass and/or portion of a pass. In response to receiving input selecting the option, the cab computer may identify the start condition.

Additionally or alternatively, the computing system may identify the start condition from one or more actions of the agricultural implement and/or vehicle. For example, one or more sensors or application controllers may be programmed or configured to control an agricultural implement and/or vehicle and/or monitor one or more actions of the agricultural implement and/or vehicle. Data from the sensors or application controllers may be sent to the cab computer and/or agricultural intelligence computer system. The cab computer and/or agricultural intelligence computer system may identify a start condition when the agricultural vehicle and/or implement begins one or more operations while records of the agricultural vehicle and/or implement are not being aggregated into a data file. The one or more operations may include moving through the agricultural field, planting on the field, releasing one or more chemicals onto the field, releasing water onto the field, harvesting the field, and/or any other operation relating to crop planting, management, or harvesting.

The computing system may additionally or alternatively identify a start condition when the agricultural implement and/or vehicle begins a new pass on the agricultural field. The computing system may determine a new pass is being performed if a current heading of the agricultural implement and/or vehicle is greater than a threshold angle different from a previous heading. For example, if the heading of an agricultural vehicle is greater than 45° different than the heading of the agricultural vehicle five seconds prior, the computing system may determine a new pass is being initiated. Additionally or alternatively, the computing system may determine a new pass is being initiated based on a current location of the agricultural vehicle in reference to a prescription map identifying passes in the field.

In an embodiment, the computing system identifies a start condition based on a height of a header of a combine. For example, the computing system may store a predetermined and/or modeled threshold height value. When the header of the combine lowers below the threshold height value, the computing system may determine that a new pass is being performed and/or may identify the start condition. Conversely, when the header height raises above the threshold value, the computing system may determine a pass is being completed and/or may identify a stop condition.

At step 1204, a new data file is generated. For example, the cab computer or agricultural intelligence computer system may generate a new file for recording data from the agricultural implement and/or agricultural vehicle in response to identifying the start condition. As a practical example, the agricultural intelligence computer system may create a ".dat" file when an agricultural vehicle begins moving through the field after having been stopped for a particular period of time.

At step 1206, the system begins recording data of an apparatus moving through an agricultural field into the data file. For example, the system may record a plurality of records into the data file relating to the agricultural implement and/or vehicle. The records may include one or more of a temporal component, such as a time a measurement is taken and/or the record is recorded, a separate measurement component, such as a seed population planted, crop harvested, or chemical applied, and a location component, such as GPS coordinates of the agricultural implement and/or vehicle. The system may record a new record at specific temporal intervals, such as every 0.2 seconds, or at intervals based on the actions of the implement and/or vehicle, such as number of seeds planted or distance moved.

At step 1208, the system identifies a stop condition. The stop condition may be one that is explicitly input, such as receiving input through the cab computer to stop recording a pass. For example, the cab computer may display an option while recording a pass and/or portion of a pass to stop recording. In response to receiving input selecting the option, the cab computer may identify the stop condition.

Additionally or alternatively, the computing system may identify the stop condition from one or more actions of the agricultural implement and/or vehicle. For example, one or more sensors or application controllers may be programmed or configured to control an agricultural implement and/or vehicle and/or monitor one or more actions of the agricultural implement and/or vehicle. Data from the sensors or application controllers may be sent to the cab computer and/or agricultural intelligence computer system. The cab computer and/or agricultural intelligence computer system may identify a stop condition when the agricultural implement and/or vehicle stops an action or changes an action. For example, the computing system may identify the stop condition when the agricultural implement and/or vehicle stops moving for more than a threshold period of time, such as ten seconds, stops planting, harvesting, spraying, or otherwise stopping an operation relating to crop planting, management, or harvesting for more than a threshold period of time. As another example, the computing system may identify the stop condition when the agricultural implement changes direction by an angle greater than a stored threshold, changes a seeding rate by more than a threshold population, changes a spraying rate by more than a threshold volume, moves into a different management zone, travels a particular distance, and/or other preprogrammed stop conditions relating to a change in the functioning and/or controlling of the agricultural implement and/or vehicle.

At step 1210, the data file is stored. For example, agricultural intelligence computing system and/or at the cab computer may store a data file comprising recorded data corresponding to the time between the start condition and the stop condition. In an embodiment, the data file is created by the cab computer and sent to the agricultural intelligence computer system for storage. Additionally or alternatively, the data captured from the agricultural implement and/or vehicle may be sent by the cab computer to the agricultural intelligence computer system which generates data files based on the start and stop conditions.

Steps 1202-1210 may be completed a plurality of times for an agricultural field as the apparatus performs one or more functions on the agricultural field. For example, a new data file may be created for each pass, each identified change in planting, movement, or other management activity, and/or each management zone. Thus, multiple data files may correspond to a single pass and/or a single data file may span multiple passes.

At step 1212, a field map is displayed through a graphical user interface. For example, a field map may be displayed on the cab computer and/or a client computing device and the cab computer and/or client computing device may receive touchscreen input to select a field creation option from among options in a list of options, as described with respect to FIG. 7. In an embodiment, the list of options includes a "dragging selection option" which is selected through the touchscreen input.

At step 1214, input is received through the graphical user interface selecting multiple locations on the field map. The input may include individual taps of multiple points on the map and/or a dragging input across a region in the field. A computing system may be programmed or configured to identify, for a plurality of tapped locations and/or locations corresponding to the dragging input, a location on the agricultural field.

At step 1216, a corresponding data file is identified for each selected location. For example, the computing system may identify each data file that corresponds to a tapped location or location corresponding to the dragging input. As a practical example, if a user initiates a dragging input across a pass of a field which corresponds to multiple data files, the agricultural intelligence computer system may only select the data files that correspond to the dragging input. Thus, input of a point on a pass may cause the server computer to select a data file that corresponds to less than the full pass and/or select a data file that corresponds to locations within multiple passes.

At step 1218, a region bounded by data in the identified corresponding data files is generated. For example, the computing system may use the selected data files to identify a region which includes the locations identified in the selected data files. The regions may be bounded at the locations at the edges of the data files. Thus, the boundaries of a selection may be different than the boundaries of the field and/or pass. This allows for a logical selection of boundaries from input selecting individual locations based on the start and stop conditions.

At step 1220, the display is updated to include a data panel corresponding to the generated region. For example, the computing system may retrieve data from the stored data files, such as measurements or other management data, and use the retrieved data to generate a data panel interface, such as the interface of FIG. 11 described above. Thus, the data panel may correspond to the region defined at step 1218 using the data from the data files used to create the region at step 1218. Additionally or alternatively, data from outside the data files used to generate the region may be used to create the data panel. For instance, the computing system may extract data corresponding to locations in the selected data files from different data files with different boundaries. For example, if the region is created based on data files generated during harvesting operations and the data panel includes data corresponding to planting operations, the computing system may identify planting data that corresponds to locations identified in the harvesting data files.

As a practical example of the method of FIG. 12, an agricultural vehicle may begin seeding a field and sending data to an agricultural intelligence computer system which is based on monitored seeding rates. If the agricultural vehicle is stopped during a particular pass, such as to change the hybrids or adjust a parameter of the vehicle, the agricultural intelligence computer system may identify a stop condition and store a data file. When the agricultural vehicle begins seeding again, the agricultural intelligence computer system may generate a new data file and record data received from the agricultural vehicle in the new data file. When the agricultural intelligence computer system causes display of the agricultural field on a client computing device and receives input selecting a location corresponding to the first file, the agricultural intelligence computer system may display a region that is bounded at the location where the agricultural vehicle stopped, as that location would mark the edge of the locations in the stored data file.

By generating and storing data files based on the start and stop conditions, the agricultural intelligence computer system is able to generate logical boundaries for regions selected through a client computing device. This allows for greater fidelity in displayed information and for easier updating of stored data. For example, if the stopping of the agricultural implement was due to a change in the hybrid, a user would be able to easily select a portion of the field prior to the change and input the hybrid type used for that portion as the selected region would be bounded by the location where the vehicle stopped for the change in hybrid.

3.4 Defining Field Regions Chronologically

In an embodiment, the graphical user interface comprises one or more options to select portions of the agricultural field chronologically. The agricultural intelligence computer system and/or cab computer may store, in one or more data files, a plurality of records, each of which comprising data describing at least a physical location of an agricultural implement and/or vehicle and a time at which the agricultural implement and/or vehicle was at or performed an action at the physical location. For example, a seeding data record may identify a location of a planter at a particular time, a population planted at the location and particular time, and a seed type being planted at the location and the particular time.

A cab computer and/or client computing device may cause display of an image of an agricultural field with an option for selecting passes and/or portions of passes chronologically, such as through an option in the interface of FIG. 9. A user may select the option for selecting passes and/or portions of passes chronologically through a display on the cab computer and/or through a display on a client computing device which indicates the selection to the agricultural intelligence computer system. In response to receiving the input selecting the option for selecting passes and/or portions of passes chronologically, the cab computer and/or agricultural intelligence computer system may cause displaying a timeline on the interface displayed on the cab computer and/or client computing device with options for selecting a lower bound on the timeline and an upper bound on the timeline, such as through a dragging of one or more boundaries of the timeline.

When an upper bound and a lower bound have been selected, the cab computer and/or agricultural intelligence computer system may identify, in the stored data records, a plurality of locations that correspond to times that are within a time period between a time corresponding to the selected lower bound and a time corresponding to the selected upper bound. The agricultural intelligence computer system may generate an overlay for the map which displays a region which includes the plurality of locations and/or a data panel corresponding to the plurality of locations.

In an embodiment, the cab computer and/or agricultural intelligence computer system identifies each data file which comprises at least one record that includes a time within the time period between the time corresponding to the selected lower bound and the time corresponding to the selected upper bound. The cab computer and/or agricultural intelligence computer system may then generate an overlay for the map which displays a region which includes all locations identified in the stored data files and/or a data panel corresponding to all locations identified in the stored data files. The cab computer and/or agricultural intelligence computer system may additionally modify the selection on the timeline by moving the lower bound to the earliest time in the identified data files and/or by moving the upper bound to the latest time in the identified data files.

In an embodiment, the cab computer and/or agricultural intelligence computer system identifies each pass where at least a portion of the pass was performed during a time within the time period between the time corresponding to the selected lower bound and the time corresponding to the selected upper bound. The cab computer and/or agricultural intelligence computer system may then generate an overlay for the map which displays a region which includes all locations within the identified passes and/or a data panel corresponding to all locations in the identified passes. The cab computer and/or agricultural intelligence computer system may additionally modify the selection on the timeline by moving the lower bound to the earliest time in the identified passes and/or by moving the upper bound to the latest time in the identified data files.

By using a chronological selection, the computing system is able to logically group data records based on when an agricultural implement or vehicle performed a task on an agricultural field. This unique method for displaying information improves the use of the graphical user interface by allowing data to be aggregated based on when an agricultural activity occurred. Thus, if an event occurred at a particular time, the display could be used to compare results of agricultural activities prior to the event with results of agricultural activities after the event. Additionally, the use of the data files from section 3.3 allows the computing system to identify logical boundaries based on a chronological selection, thereby decreasing the accuracy at which a user must select times to produce a request result.

What is claimed is:

1. A system comprising:
one or more processors; and
a memory storing instructions which, when executed by the one or more processors, cause performance of:
creating a plurality of data files by performing, for each data file of the plurality of data files:
identifying a start condition;
in response to identifying the start condition, generating a new data file;
recording data of an apparatus moving through an agricultural field in the new data file, the data comprising locations of the apparatus during said recording;
identifying a stop condition; and
in response to identifying the stop condition, storing the new data file, the new data file being a data file in the plurality of data files;
displaying a field map corresponding to the agricultural field through a graphical user interface;
receiving input through the graphical user interface selecting multiple locations on the field map;
for each selected location of the multiple locations, identifying a corresponding data file of the plurality of data files;
generating a geographic region comprising locations in the identified corresponding data files, the geographic region being bounded by edges of the locations in the identified corresponding data files;
displaying the geographic region through the graphical user interface; and
updating the graphical user interface to include a data panel corresponding to the geographic region.

2. The system of claim 1, wherein the instructions, when executed by the one or more processors, further cause performance of:
receiving a plurality of values defining a header of the apparatus at a plurality of times; and
determining that the header at a particular time is greater than a threshold angle different from a header at a particular previous time,
wherein the start condition is identified in response to determining that the header at the particular time is greater than the threshold angle different from the header at the particular previous time.

3. The system of claim 1, wherein the instructions, when executed by the one or more processors, further cause performance of:
receiving a plurality of values defining a height of a header of the apparatus at a plurality of times; and
determining, from the plurality of values, that the height of the header has lowered below a threshold height value,
wherein the start condition is identified in response to determining, from the plurality of values, that the height of the header has lowered below the threshold height value.

4. The system of claim 1, wherein the instructions, when executed by the one or more processors, further cause performance of:
storing a prescription map for the agricultural field identifying a plurality of passes in the agricultural field; and
determining that a location of the apparatus is within a different pass from a prior location of the apparatus,
wherein the start condition is identified in response to determining that the location of the apparatus is within the different pass from the prior location of the apparatus.

5. The system of claim 1, wherein the instructions, when executed by the one or more processors, further cause performance of:
determining that the apparatus has stopped for greater than a threshold period of time,
wherein the stop condition is identified in response to determining that the apparatus has stopped for greater than the threshold period of time.

6. The system of claim 1, wherein the data panel comprises aggregated data relating from each location identified in the one or more of the identified corresponding data files.

7. The system of claim 6, wherein the aggregated data comprises one or more of planting data, harvesting data, chemical application data, or crop characteristic data.

8. The system of claim 1, wherein recording data of the apparatus moving through the agricultural field in the new data file comprises recording, for each of a plurality of intervals, a temporal component, a separate measurement component, and a location component.

9. The system of claim 8, wherein receiving input through the graphical user interface selecting multiple locations on the field map comprises:
displaying, through the graphical user interface, a timeline and one or more options for selecting a lower bound on the timeline and an upper bound on the timeline; and
receiving input selecting a particular lower bound and a particular upper bound on the timeline;
wherein the multiple locations correspond to times between the particular lower bound and the particular upper bound.

10. The system of claim 9, wherein the instructions, when executed by the one or more processors, further cause performance of:
determining that a particular data file of the one or more of the identified corresponding data files comprises an entry with a time component that is prior to the lower bound and, in response, updating the lower bound on the timeline on the graphical user interface to match an earliest time in the particular data file.

11. A computer-implemented method comprising:
creating a plurality of data files by performing, for each data file of the plurality of data files:
identifying, at a computing system, a start condition;
in response to identifying the start condition, generating a new data file;
recording data of an apparatus moving through an agricultural field in the new data file, the data comprising locations of the apparatus during said recording;
identifying a stop condition; and
in response to identifying the stop condition, storing the new data file, the new data file being a data file in the plurality of data files;
displaying a field map corresponding to the agricultural field through a graphical user interface;
receiving input through the graphical user interface selecting multiple locations on the field map;
for each selected location of the multiple locations, identifying a corresponding data file of the plurality of data files;
generating a geographic region comprising locations in the identified corresponding data files, the geographic region being bounded by edges of the locations in the identified corresponding data files;
displaying the geographic region through the graphical user interface; and
updating the graphical user interface to include a data panel corresponding to the geographic region.

12. The computer-implemented method of claim 11, further comprising:
receiving, at the computing system, a plurality of values defining a header of the apparatus at a plurality of times; and
determining that the header at a particular time is greater than a threshold angle different from a header at a particular previous time,
wherein the start condition is identified in response to determining that the header at the particular time is greater than the threshold angle different from the header at the particular previous time.

13. The computer-implemented method of claim 11, further comprising:
receiving, at the computing system, a plurality of values defining a height of a header of the apparatus at a plurality of times; and
determining, from the plurality of values, that the height of the header has lowered below a threshold height value,
wherein the start condition is identified in response to determining, from the plurality of values, that the height of the header has lowered below the threshold height value.

14. The computer-implemented method of claim 11, further comprising:
storing a prescription map for the agricultural field identifying a plurality of passes in the agricultural field; and determining that a location of the apparatus is within a different pass from a prior location of the apparatus, wherein the start condition is identified in response to determining that the location of the apparatus is within the different pass from the prior location of the apparatus.

15. The computer-implemented method of claim 11, further comprising:

determining that the apparatus has stopped for greater than a threshold period of time, wherein the stop condition is identified in response to determining that the apparatus has stopped for greater than the threshold period of time.

16. The computer-implemented method of claim 11, wherein the data panel comprises aggregated data relating from each location identified in the one or more of the identified corresponding data files.

17. The computer-implemented method of claim 16, wherein the aggregated data comprises one or more of planting data, harvesting data, chemical application data, or crop characteristic data.

18. The computer-implemented method of claim 11, wherein recording data of the apparatus moving through the agricultural field in the new data file comprises recording, for each of a plurality of intervals, a temporal component, a separate measurement component, and a location component.

19. The computer-implemented method of claim 18, wherein receiving input through the graphical user interface selecting multiple locations on the field map comprises:

displaying, through the graphical user interface, a timeline and one or more options for selecting a lower bound on the timeline and an upper bound on the timeline; and receiving input selecting a particular lower bound and a particular upper bound on the timeline;

wherein the multiple locations correspond to times between the particular lower bound and the particular upper bound.

20. The method of claim 19, further comprising:

determining that a particular data file of the one or more of the identified corresponding data files comprises an entry with a time component that is prior to the lower bound and, in response, updating the lower bound on the timeline on the graphical user interface to match an earliest time in the particular data file.

* * * * *